UNITED STATES PATENT OFFICE.

MILTON H. CAMPBELL, OF SYRACUSE, NEW YORK, ASSIGNOR OF THREE-FOURTHS OF HIS RIGHT TO A. H. MATSON, EDWARD F. BUTTERFIELD, AND WILLIAM H. HUBBARD.

IMPROVEMENT IN MEDICAL COMPOUNDS.

Specification forming part of Letters Patent No. 128,110, dated June 18, 1872.

Specification describing a certain Compound called Local Anæsthetic, invented by MILTON H. CAMPBELL, of Syracuse, in the county of Onondaga and State of New York, to be used in extracting teeth and for other surgical purposes.

The nature of said invention is so to affect the parts to be operated upon as to render them insensible to pain, or nearly so, during the operation, without the danger attendant on a general anæsthetic.

This compound consists of the following ingredients, to wit: Saturated tincture of pyrethrum, one gallon; veratria, three-fourths ounce; acetate of morphine, one-half ounce; the whole to be well mixed and filtered. These ingredients and proportions are such as I have found best for the purpose, although the proportions may, perhaps, be slightly changed and their isomerical equivalents substituted.

I claim as my invention—

A compound composed of the ingredients herein named, substantially as and for the purposes herein set forth.

MILTON H. CAMPBELL.

Witnesses:
J. J. GREENOUGH,
WM. H. HUBBARD.